United States Patent [19]

Richmond

[11] Patent Number: 5,791,376
[45] Date of Patent: Aug. 11, 1998

[54] QUICK DISCONNECT VALVE SYSTEM FOR ABRASIVE SLURRIES

[75] Inventor: Curtis Lee Richmond, Gilbert, Ariz.

[73] Assignee: MEGA Systems & Chemicals, Inc., Chandler, Ariz.

[21] Appl. No.: 649,056

[22] Filed: May 16, 1996

[51] Int. Cl.$^6$ ............................................. F16L 37/28
[52] U.S. Cl. ........................ 137/614.04; 137/614
[58] Field of Search ................ 137/614.04, 614.03, 137/614

[56] References Cited

U.S. PATENT DOCUMENTS

| | | |
|---|---|---|
| 2,265,435 | 12/1941 | Kinzie et al. |
| 2,545,796 | 3/1951 | Scheiwer ............... 137/614.04 |
| 2,665,928 | 1/1954 | Omon et al. .......... 137/614.04 X |
| 3,380,469 | 4/1968 | Salerno et al. |
| 3,415,269 | 12/1968 | Salerno |
| 3,529,619 | 9/1970 | Drewry et al. |
| 3,650,288 | 3/1972 | Bruton et al. |
| 3,654,950 | 4/1972 | Hamm |
| 4,565,210 | 1/1986 | Heine et al. |

FOREIGN PATENT DOCUMENTS 1081250  8/1967  United Kingdom .............. 137/614.04

OTHER PUBLICATIONS

Fluoropure® Quick Connect System. Fluoropure® Chemical Container Products, pp. 7.9–7.10.

*Primary Examiner*—Kevin Lee
*Attorney, Agent, or Firm*—Cahill, Sutton & Thomas, P.L.C.

[57] ABSTRACT

A quick-disconnect system for selectively connecting a slurry tank to a fluid supply line includes a first valve on the slurry tank and a second valve in the supply line fitting. Each of such valves includes a piston having a tapered neck extending from such valves. Each such piston slides within a cylinder having fluid passages extending through the walls of such cylinder, and each cylinder is received within a valve body. A biasing spring ordinarily advances such pistons to cause enlarged side wall portions of such pistons to seal the fluid passages that extend through the cylinders. Each piston has a tapered neck portion that extends outwardly from the valve, and upon connection of quick-disconnect system, the tapered neck portions of the pistons engage each other to simultaneously overcome the biasing springs. As each piston retracts, the enlarged side wall portions of the pistons slide past the fluid passages that extend through the cylinders, and are removed from the abrasive fluid flow path. The biasing springs are contained between the pistons and the closed ends of the cylinders, thereby isolating the biasing springs from the abrasive fluid flow path.

21 Claims, 5 Drawing Sheets

QUICK DISCONNECT VALVE SYSTEM FOR ABRASIVE SLURRIES

BACKGROUND OF THE INVENTION

1. Field of the Invention

The present invention relates generally to valve systems, and more particularly to a quick disconnect valve system facilitating rapid connection and disconnection of an abrasive slurry tank to a chemical supply line.

2. Description of the Relevant Art

Manufacturers of integrated circuits regularly use chemical processing equipment when processing semiconductor wafers. Chemicals that are used in such manufacturing processes are often supplied by vendors in large tanks, drums or "totes". The chemical processing equipment which actually performs work upon the semiconductor wafers typically includes chemical supply lines having fittings that may be interconnected with the chemical tanks. Due to the importance of avoiding the introduction of chemical impurities, it has been known to equip such chemical tanks with shut-off valves that mate with similar shut-off valves provided within the fittings of the chemical supply lines extending from the chemical processing equipment. For example, the FluoroPure Chemical Container Products Division of Fluoroware, Inc. of Chaska, Minn. has marketed a quick connect system under the registered trademark "FluoroPure" wherein chemical supply drums are equipped with shut-off valves that may be quickly connected or disconnected from mating shut-off valves installed within chemical supply lines, thereby providing non-intrusive access to such chemical supply drums. When the supply line is coupled to the chemical supply drum, the valves open, allowing the exchange of fluid from the chemical supply drum to the supply line.

However, some chemical processes used to manufacture semiconductor wafers require the use of an abrasive slurry, for example, during the process of polishing the surfaces of raw semiconductor wafers (so-called "chemical mechanical polishing"). Abrasive slurries present a number of problems that are not necessarily encountered with other types of chemical fluids used in processing semiconductor wafers. For example, abrasive slurries tend to attack and abrade the valve seats, O-rings and seals of conventional shutoff valves. Accordingly, conventional valves would have a very short life when used in conjunction with such abrasive slurries.

Another unique problem presented by chemical slurries is the need to continuously circulate the chemical slurry between the slurry reservoir and the chemical processing equipment in order to maintain the abrasive slurry particles in suspension. Slurries often contain particles of oxide, tungsten, alumina, or silica that are suspended in a liquid carrier. Unless the slurry is continuously circulated and agitated within the slurry reservoir, the abrasive particles tend to settle out within the reservoir. This need for constant circulation only increases the danger of abrading and wearing out conventional shutoff valves. Moreover, the need for continuous circulation introduces concerns relating to acceptable back pressure, or pressure drop; circulation of chemical slurries through known quick-connect systems creates excessive back-pressure, or pressure drop, caused by shutoff valves that restrict the flow of fluid therethrough.

In addition, conventional valves often include a metal spring within the fluid flow path. While many chemicals used in semiconductor wafer processing would not ordinarily attack such metal springs, abrasive slurries wear away the surface of the metal spring, thereby introducing metal contaminants into the flow path; such metal contaminants can reduce the yields of integrated circuits made from such semiconductor wafers, and are to be avoided.

Accordingly, it is an object of the present invention to provide a quick disconnect system which may be used to quickly and conveniently connect a fluid reservoir with a chemical supply line, while automatically sealing both the fluid reservoir and the chemical supply line upon disconnection.

It is another object of the present invention to provide such a quick disconnect system which has a relatively long life even when used in conjunction with abrasive chemical slurries.

It is still another object of the present invention to provide such a quick disconnect system wherein the surface used to shut off fluid flow is removed from the flow path during full-flow operation.

It is yet another object of the present invention to provide such a disconnect system which substantially reduces the likelihood of the introduction of metal contaminants within the fluid flow path.

A further object of the present invention is to provide such a quick disconnect system that permits free, unrestricted fluid flow of chemical slurries without creating excessive pressure drops through the shutoff valves incorporated within such quick-disconnect system.

A still further object of the present invention is to provide such a quick disconnect system which can be manufactured relatively easily and inexpensively.

These and other objects of the present invention will become more apparent to those of skill in the art as the description of the present invention proceeds.

SUMMARY OF THE INVENTION

Briefly described, and in accordance with one preferred embodiment thereof, the present invention relates to a quick-disconnect valve that includes a piston having an enlarged annular side wall portion that slides within the bore of a cylinder. The cylinder has at least one, and preferably, a plurality of generally annular fluid passageways that extend through the cylinder wall from the outer wall of the cylinder to the inner wall of the cylinder generally near a first open end of the cylinder. In the preferred embodiment of the present invention, these fluid passageways are of sufficient cross-sectional size and number wherein the sum of the cross-sectional areas of the fluid passageways approximates the minimum cross-sectional area for fluid flow provided at other points in the supply line.

The quick-disconnect valve also includes a valve body having a central chamber for containing the cylinder and the piston; the valve body is sealed to the cylinder at a point located between the fluid passageway and the first open end of the cylinder. The valve body provides a first port communicating with the outer wall of the cylinder and with the fluid passageway opening formed in the outer wall of the cylinder for conveying fluid between the first port of the valve body and the fluid passageway. The valve body also includes a second port communicating with the first open end of the cylinder and the first end of said piston. The piston includes a neck portion extending generally between the first end of the piston and the enlarged annular side wall portion thereof. The lateral dimensions of the neck portion are reduced in comparison with the diameter of the enlarged annular side wall portion of the piston for allowing fluid to flow along the neck portion of the piston. When the valve is "closed", the tip of this neck portion actually extends beyond the second port of the valve body.

The valve of the present invention also includes a biasing mechanism, such as a metal compression spring, that engages the piston for biasing the piston toward the first open end of the cylinder and away from the opposing second end of the cylinder. When biased toward such position, the enlarged annular side wall portion of the piston slides across and seals the fluid passageway that extends through the internal wall of the cylinder. However, the biasing mechanism yields to the application of a force upon the first end of the piston for allowing the piston to slide within the cylinder toward the second end of the cylinder. In this event, the enlarged annular side wall portion of the piston is displaced away from the generally fluid passageway that extends through the internal wall of the cylinder, allowing fluid to flow freely through the generally annular fluid passageway between the first and second ports of the valve body.

To enhance fluid flow, the fluid passageways of the cylinder walls are generally directed toward the open end of the cylinder, and may be curved to avoid a right-angle bend in fluid flow path. Likewise, the neck portion of the piston is preferably tapered from the first end of the piston toward the enlarged annular side wall portion thereof; the diameter of the tapered neck portion is smallest at the first end of the piston and gradually increases in diameter as the tapered neck portion extends toward the enlarged annular side wall portion.

In the preferred embodiment of the invention, the second end of the cylinder is closed, and the biasing spring is contained within the cylinder between the piston and the second closed end of the cylinder. The biasing spring therefore lies outside the fluid flow path and is not abraded by chemical slurries. A vent hole is preferably formed in the second closed end of the cylinder; the vent hole does not allow significant fluid flow therethrough, but avoids restriction on sliding movement of the piston due to compression or expansion of the space between the piston and the closed end of the cylinder.

The present invention also relates to a quick-disconnect system incorporating at least two of the valves just described, one such valve being installed upon and communicating with a chemical supply reservoir, and the other valve being incorporated within a fluid supply line, for allowing the fluid supply line to be quickly connected to or disconnected from the fluid supply reservoir without contaminating either the fluid reservoir or the fluid supply line. The quick-disconnect system includes a mechanism for selectively fastening together the second port of the first valve body with the second port of the second valve body. As the first and second valves are connected together, the projecting neck portions of the pistons within the first and second valves contact and push against each other. These mutual forces simultaneously overcome the biasing springs included within each of such valves for allowing fluid to flow freely between the two valves following their connection, and hence between the fluid reservoir and the fluid supply line.

DETAILED DESCRIPTION OF THE PREFERRED EMBODIMENTS

Figure 1:
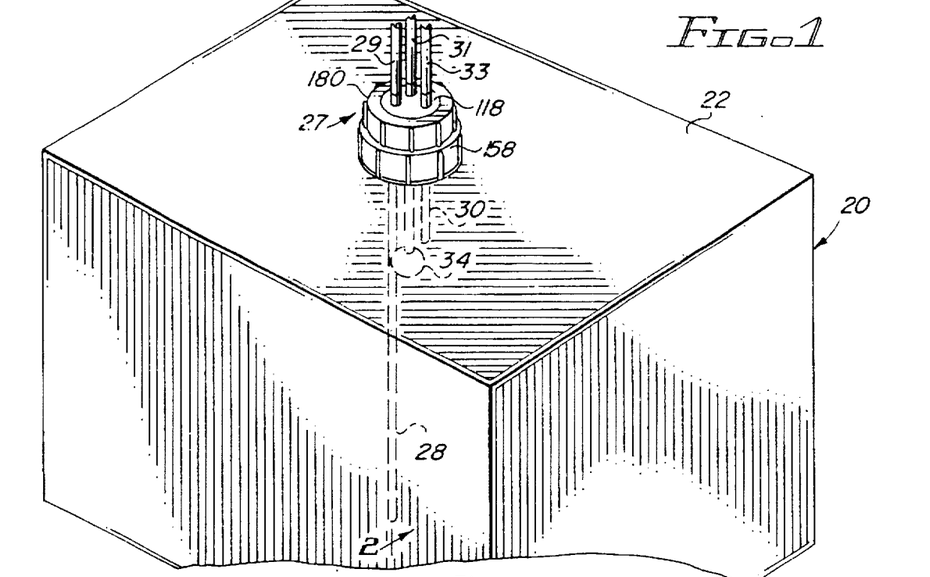
FIG. 1 is a perspective view of a rectangular chemical container, or tote, used to transport chemicals in bulk, and including a valve assembly in accordance with the teachings of the present invention.
Figure 2:
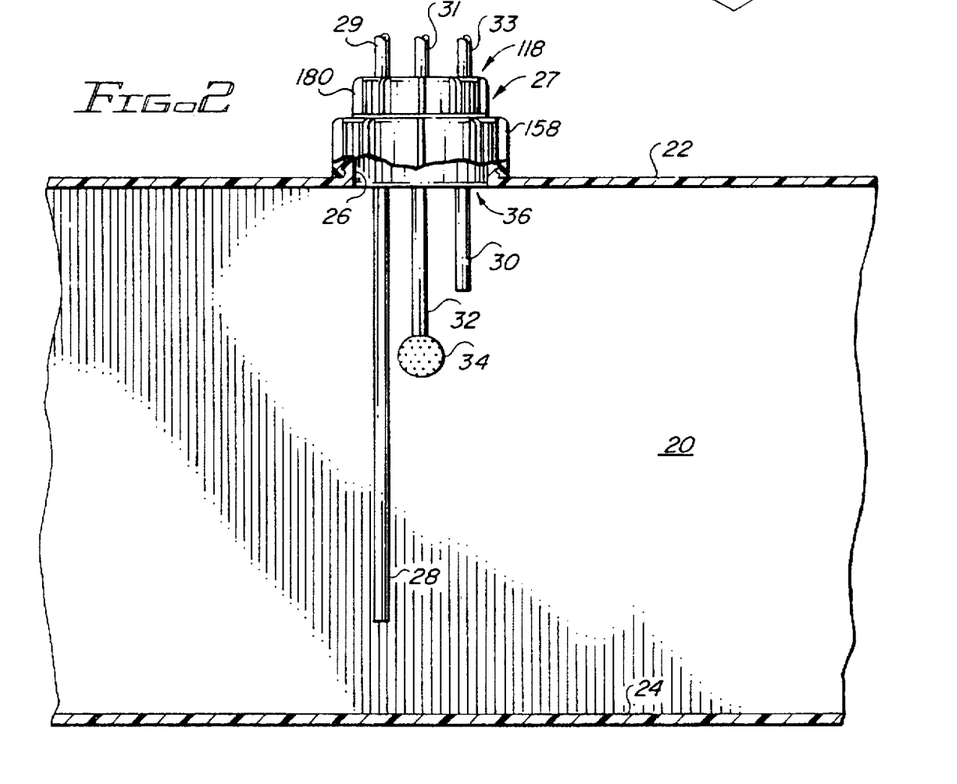
FIG. 2 is a sectional view of the apparatus shown in FIG. 1 taken through the plane identified by lines 2—2 within FIG. 1.

Within FIGS. 1 and 2, a bulk chemical slurry container, or tote, is designated generally by reference numeral 20. Tote 20 is essentially a reservoir of a chemical fluid. Such totes typically contain 300 gallons of chemical slurry, have obtained approval by the U.S. Department of Transportation (DOT), and are becoming a standard in the integrated circuit industry. Tote 20 includes a top wall 22 and a bottom wall 24. As shown best in FIGS. 3 and 5, top wall 22 of tote 20 includes an access neck 26 having an externally threaded collar. During transport of tote 20 from the chemical supplier to the integrated circuit manufacturer, this neck is sealed with a DOT-approved cap (not shown).

When tote 20 is used in conjunction with the present invention, the aforementioned DOT-approved cap is removed, and a quick disconnect assembly 27 is secured over access neck 26. Three supply lines 29, 31, and 33 extend outwardly from the top of quick disconnect assembly 27; these supply lines extend to chemical processing equipment (not shown), for example, a semiconductor wafer polishing machine. In addition, three access pipes extend downwardly from quick disconnect assembly 27 through access neck 26 into the interior of tote 26. First access pipe 28 is a suction line and extends to a point approximately six inches above bottom wall 24 of tote 20 for withdrawing chemical slurry from tote 20; in use, first access pipe 28 is in fluid communication with supply line 29. Second access pipe 30, which is approximately six inches in length, is a return line which expels returned slurry to tote 20 proximate top wall 22 of tote 20; in use, second access pipe 30 is in fluid communication with supply line 31. As mentioned above, chemical slurries must be continuously agitated in order to maintain the abrasive particles in suspension. The continuous withdrawal of chemical slurry from the lowermost portion of tote 20, coupled with the continuous return of chemical slurry to the uppermost portion of tote 20, helps to ensure that the contents of tote 20 are maintained in an agitated state. Finally, a third access pipe 32 has a spray nozzle attached at the lower end thereof for allowing water or other solvents to be sprayed throughout tote 20 after the chemical slurry is expended, and tote 20 is empty; third access pipe is in fluid communication with supply line 33. Third access pipe 32 may also be used to admit make-up air to tote 20 during use. A capped drain hole (not shown) is provided near the bottom of tote 20 for draining the water or other solvent from tote 20.

Figure 3:
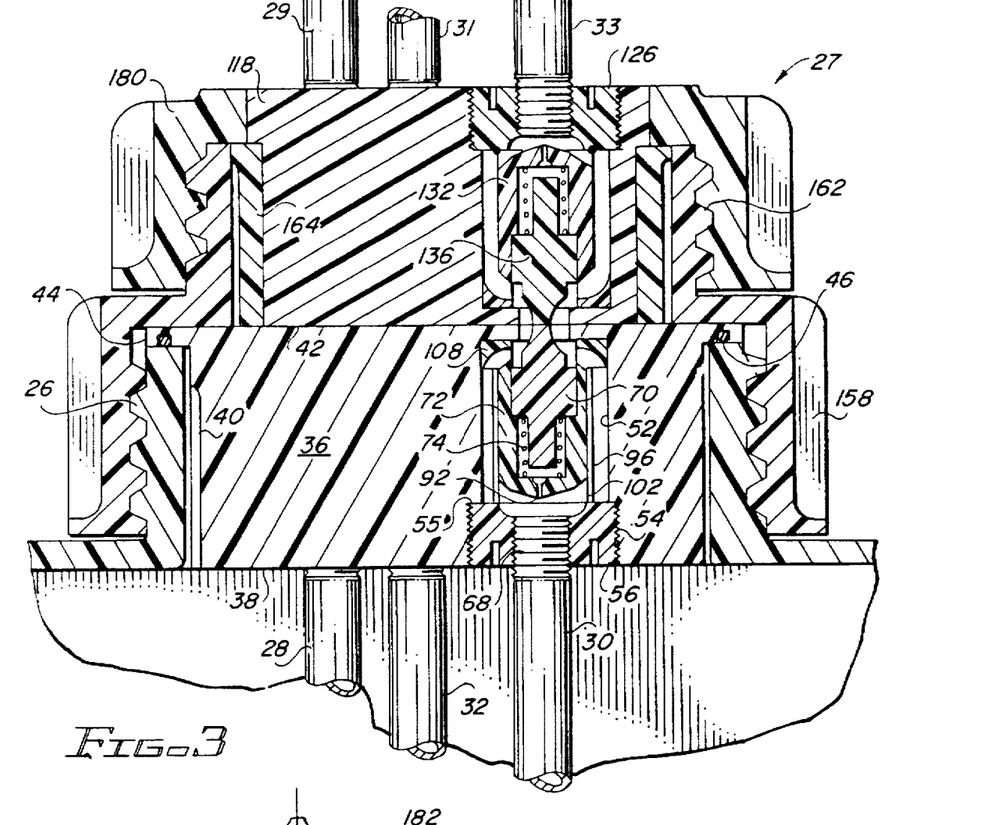
FIG. 3 is an enlarged sectional view of the valve assembly shown in FIGS. 1 and 2.
Figure 4A:
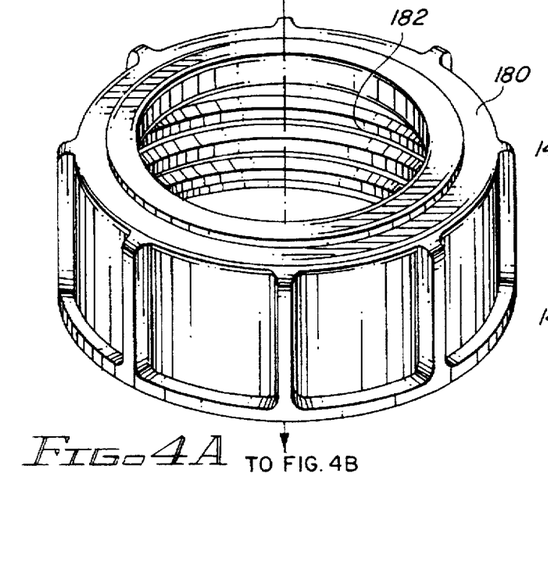
FIGS. 4A and 4B are collectively an exploded perspective view of the valve assembly shown in FIG. 3 as viewed from above.
Figure 4B:
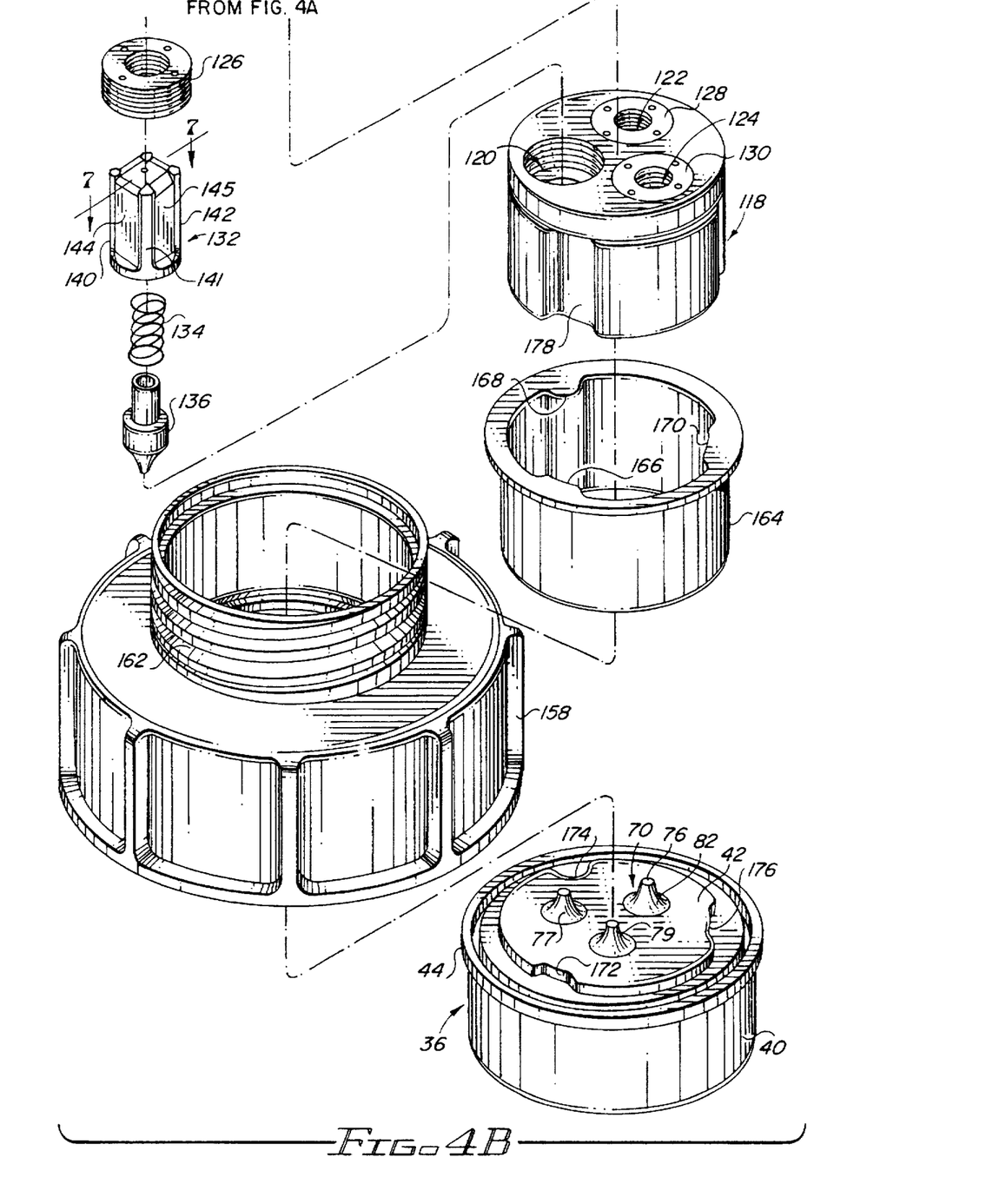
Figures 5, 6:
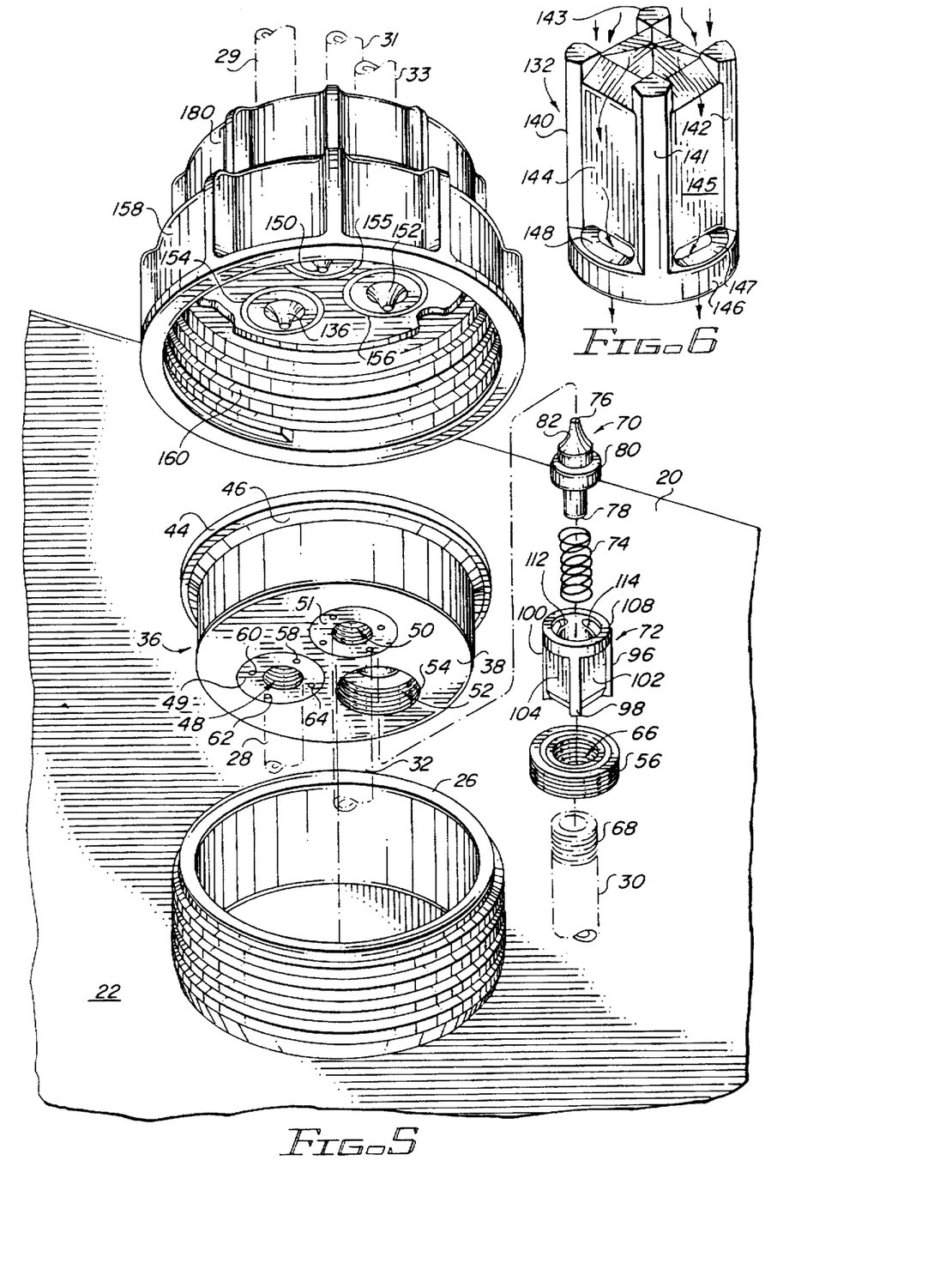
FIG. 5 is a partially exploded perspective view of the valve assembly shown in FIGS. 4A and 4B but viewed from below.
FIG. 6 is an enlarged perspective view of a valve body shown in FIG. 4B.

With reference to FIGS. 3, 4B and 5, access neck 26 receives a first valve assembly 36 which can be machined from DELRIN brand plastic, but which may also be molded from other suitable plastic materials. Valve assembly 36 includes a horizontal bottom wall 38, an annular side wall 40, and an upper wall 42. The diameter of annular side wall 40 is commensurate with the inner diameter of access neck 26 of tote 20, allowing valve assembly 36 to be inserted into access neck 26 of tote 30. Annular side wall 40 terminates near the upper end thereof in an enlarged annular flange 44 having a diameter approximating the external diameter of access neck 26 of tote 20. The underside of annular flange 44 has a circular channel formed therein for receiving a rubber O-ring 46.

As indicated in FIGS. 3 and 5, valve assembly 36 has three passageways 48, 50 and 52 formed therethrough extending from bottom wall 38 to upper wall 42. These three passageways may be arranged in a triangular pattern in the manner shown in FIG. 5. Each of passageways 48, 50 and 52 includes an enlarged, internally threaded portion; for example, passageway 52 includes a central bore opening into an enlarged threaded portion 54 adapted to threadedly receive a retainer ring 56. Radial wall 55 joins the central bore of passageway 52 with enlarged threaded portion 54. Retainer ring 56 is externally threaded to mate with the internal threads formed upon threaded portion 54 of passageway 52; the externally threaded portion of retainer ring 56 is designated by reference numeral 57 in FIG. 9. As shown in FIG. 5, the outer face of each such retainer ring preferably has holes, such as those designated as 58, 60, 62, and 64 extending into retainer ring 49; such holes may be engaged by prongs of a wrench (not shown) for tightening or loosening such retainer rings. The inner face of each such retainer ring includes an O-ring seal, such as O-ring seal 65 shown in FIG. 9, the purpose of which is described below.

Figures 8A, 8B, 9, 10:
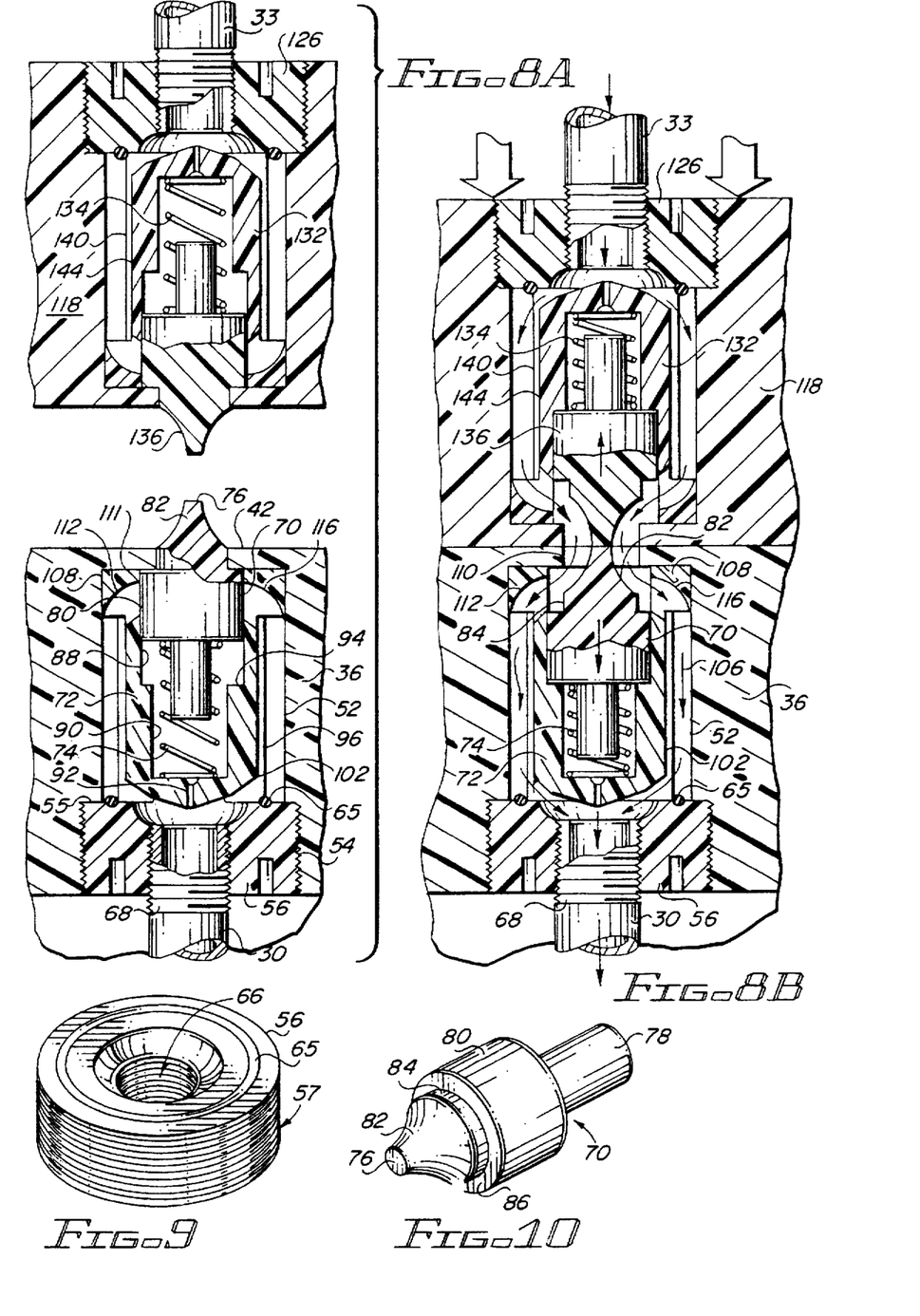
FIG. 8A is an enlarged view of two opposing closed valves, as shown in FIG. 3, before being brought in contact with each other.
FIG. 8B is an enlarged view of the same two opposing valves after being brought in contact with each other and being opened to fluid flow.
FIG. 9 is a perspective view of a threaded retainer ring used to removably assemble each valve.
FIG. 10 is a perspective view of a piston used to form one of the aforementioned valves.

Each such retainer ring has a central hole extending therethrough for allowing the passage of fluid, and each such central hole is internally threaded. For example, retainer ring 56 includes a threaded central hole 66. Access pipe 30 has a threaded upper end 68 which threadedly engages threaded central hole 66. Likewise, the upper end of access pipe 28 is threadedly engaged with the central hole of retainer ring 49, and the upper end of access pipe 32 is threadedly engaged with the central hole of retainer ring 51.

When valve assembly 36 is lowered into access neck 26, the lowermost portion of flange 44 rests upon the uppermost rim of access neck 26, and O-ring 46 forms a fluid-tight seal therebetween. It should be understood that valve assembly 36, together with access pipes 28, 30 and 32, would ordinarily be installed in access neck 26 by the chemical slurry supplier prior to shipment, and that the aforementioned DOT approved cap (not shown) would then be threaded over access neck 26 to retain valve assembly 36 within access neck 26, and to seal tote 20 for transportation.

As mentioned above, valve assembly 36 includes three passageways 48, 50, and 52. In order to accomplish the quick connect/quick disconnect features of the present invention, each such passageway houses a valve that selectively blocks or freely permits the passage of fluid therethrough. FIGS. 3 and 5 illustrate the structure of such a valve disposed within passageway 52 of valve assembly 36. The valve includes a piston 70, a cylinder 72, and a metal compression spring 74.

Piston 70, which is shown most clearly in FIG. 10, is preferably machined from Teflon material, and extends along a longitudinal axis from a first end 76 to an opposing second end 78. Piston 70 includes an enlarged annular side wall portion 80 spaced apart from first end 76 and spaced apart from second end 78. Piston 70 includes a tapered neck portion 82 extending generally between first end 76 and enlarged annular side wall portion 80. The diameter of tapered neck portion 82 at any point along its length is less than the predetermined diameter of enlarged annular side wall portion 80, the diameter of tapered neck portion 82 being smallest proximate first end 76 of piston 70 and increasing in diameter as tapered neck portion 82 extends toward enlarged annular side wall portion 80. Piston 70 further includes a short annular wall 84 extending between neck portion 82 and radial wall 86 which bounds enlarged annular side wall portion 80. As shown in FIG. 10, annular wall 84 has a lesser diameter than enlarged annular side wall portion 80. Second end 78 of piston 70 is cylindrical in shape and has a diameter less than the predetermined diameter of enlarged annular side wall portion 80.

As shown in FIG. 8A, cylinder 72, which may be machined or injection molded from polypropylene, includes an internal bore formed by inner generally-cylindrical inner walls 88 and 90 which are coaxial with each other. Inner wall 88 forms an open end at the uppermost portion of cylinder 72. Inner wall 90 is closed at its lowermost end opposite the open end of inner wall 88. A small vent hole 92 extends between the closed end of inner wall 90 and the lowermost end of cylinder 72. Inner wall 88 has a diameter commensurate with the predetermined diameter of annular side wall portion 80 of piston 70 for receiving annular side wall portion 80 of piston 70 and allowing piston 70 to slide within the internal bore of cylinder 72, as indicated within FIGS. 8A and 8B. Inner wall 90 is of reduced diameter by comparison with the diameter of inner wall 88, and a radial step 94 divides inner wall 88 from inner wall 90. The diameter of inner wall 90 is greater than the diameter of cylindrical second end 78 of piston 70; accordingly, cylindrical second end 78 is free to move longitudinally within the interior bore of cylinder 72 bounded by inner wall 90. Vent hole 92 allows any fluid disposed between piston 70 and the closed end of cylinder 72 to escape when a force is applied to first end 76 of piston 70, and also allows fluid to enter between piston 70 and the closed end of cylinder 72 when such external force is removed, and compression spring 74 biases piston 70 toward its sealed position. Nonetheless, no significant or continuous fluid flow paths are permitted through vent hole 92. Thus, even if the fluid is a chemical slurry, the rather insignificant amounts of fluid which are either sucked into, or expelled from, vent hole 92 are not of sufficient degree to abrade compression spring 74, as might introduce unacceptable levels of metal particles into the chemical slurry.

Cylinder 72 also includes outer walls, including four longitudinal, radially spaced ribs, such as those designated by reference numerals 96, 98, and 100 within FIG. 5. The radial distance between opposing ribs 96 and 100 is approximately equal to the diameter of the bore forming passageway 52 in first valve assembly 36. Ribs 96, 98 and 100 thereby serve to support cylinder 72 within passageway 52. Extending between such supporting ribs 96–100 are four planar outer side walls, such as side walls 102 and 104 shown in FIG. 5. As indicated by arrow 106 in FIG. 8B, fluid may pass between planar outer side wall 102 of cylinder 72 and the inner wall of passageway 52. The upper end of cylinder 72, proximate the open end of inner wall 88, includes an annular outer wall portion 108 which extends completely around cylinder 72 and which has a diameter equal to the diameter of the bore forming passageway 52 in first valve assembly 36. Passageway 52 terminates at its upper end in a reduced diameter bore formed by annular wall 110 (see FIG. 8B). Annular wall 110 is divided from the larger central bore of passageway 52 by a radial wall 111 (see FIG. 8A).

First valve assembly 36 may be considered to be a "valve body", and passageway 52 formed therein may be considered a central chamber for containing cylinder 72 and piston 70. First valve assembly 36 forms a seal with the upper end of cylinder 72 at the point at which annular wall 108 engages the central bore of passageway 52, and at the point at which the upper end of cylinder 72 engages radial wall 111 of passageway 52.

Annular wall 110 of passageway 52 has a diameter commensurate with the diameter of annular wall 84 of piston 70, and the length of annular wall 110 is also commensurate with the length of annular wall 84 of piston 70. As indicated in FIG. 8A, radial wall 111 acts as a stop limiting upward movement of piston 70. When piston 70 is at the uppermost point of its travel, radial wall 86 of piston 70 abuts, and seals against, radial wall 111 of passageway 52, and annular wall 84 of piston 70 lies within, and seals against, annular wall 110 of passageway 52.

As shown in FIGS. 3, 5 and 8A, a series of four fluid passageways, or openings, including those designated as 112, 114 and 116, are formed within the upper portion of cylinder 72, closer to the open end of cylinder 72 than to the closed end thereof. Openings 112, 114 and 116 are radially spaced from each other at 90 degree intervals. The separation distance between adjacent openings 112 and 114 is no greater than the width of one of the support ribs 96–100. Thus, openings 112, 114 and 116 (and the fourth such opening) collectively form a virtual annular opening through cylinder 72.

Each of such openings 112, 114, adn 116 extends from inner wall 88 of cylinder 72 outwardly to one of the four planar walls such as 102 or 104. Opening 116, for example, extends through inner wall 88 of cylinder 72 at a point slightly recessed from the upper rim of annular wall 108; opening 116 forms a curved bend outwardly and downwardly until exiting through cylinder 72 along outer planar wall 102 at a point just below annular wall 108. Opening 116 is generally directed toward the open end of cylinder 72, and the curvature of such opening avoids any sudden right angle bend that would disrupt a smooth flow path.

As shown in FIG. 8B, when piston 70 is at its lowermost point of travel, fluid can enter through annular wall 110 and pass downwardly between tapered neck 82 of piston 70 and inner annular wall 88 of cylinder 72, through openings 112 and 116, along the planar outer walls (including planar wall 102) of cylinder 72, and into the upper end of access pipe 30. Thus, valve assembly 36 may be considered to have a first lower fluid port, corresponding to threaded opening 66 within retainer ring 56, and a second upper port corresponding to the point at which annular wall 110 opens onto upper wall 42 of valve assembly 36. The first port communicates with the outer planar walls of cylinder 72, such as those identified as 102 and 104; the first port also communicates with openings 112, 114 and 116 that extend through the outer walls of cylinder 72. The second port communicates with the open end of cylinder 72 and first end 76 of piston 70 for conveying fluid to the open end of cylinder 72. Within FIG. 4B, the first end 76 of piston 70 can be seen protruding through such second port. Likewise, the ends of two other pistons 77 and 79 can be seen protruding from the second ports of their respective valves.

Compression spring 74 is inserted between the closed end of inner wall 90 of cylinder 72 and the enlarged annular wall 80 of piston 70, with the coils of compressions spring 74 surrounding the cylindrical second end 78 of piston 70. Compression spring 74 is engaged with piston 70 for biasing piston 70 away from the lower closed end of cylinder 72 and toward the upper open end of cylinder 72, as shown in FIG. 8A. When piston 70 is biased to its uppermost position within cylinder 72, enlarged annular side wall portion 80 of piston 70 is caused to slide across and seal the openings 112 and 116 that extend through internal wall 88 of cylinder 72, preventing fluid from flowing past piston 70.

However, when a sufficient downward force is applied to first end 76 of piston 70, as indicated in FIG. 8B, compression spring 74 yields to such force, allowing piston 70 to slide downwardly within cylinder 72 toward the closed end thereof. As piston 70 slides down, enlarged annular side wall portion 80 of piston 70 is displaced away from openings 112 and 116, thereby allowing fluid to flow freely through openings 112 and 116, and into access pipe 30, as shown in FIG. 8B. Thus, piston 70 serves to selectively seal or open a fluid path between the first and second ports as piston 70 slides within cylinder 72. Because compression spring 74 is disposed between piston 70 and the closed end of cylinder 72, compression spring 74 lies outside the fluid flow path of said valve. Accordingly, the flow of chemical slurry through the valve does not abrade metal spring 74.

During assembly, compression spring 74 is first inserted into the open end of cylinder 72. Piston 70 is then inserted within the open end of cylinder 72. Cylinder 72 is then inserted upwardly into passageway 52 of valve assembly 36 through enlarged threaded opening 54 until the upper rim of annular wall 108 engages and seals against radial wall 111 of passageway 52. Retainer ring 56 is then threaded into enlarged threaded opening 54 until the upper rim of retainer ring 56 seats against radial wall 55 of passageway 52. The construction of the valve is then complete, and access pipe 30 may then be connected to retainer ring 56. Those skilled in the art will appreciate that the lowermost ends of planar outer walls 102 and 104 of cylinder 72 are tapered inwardly near the lower end of cylinder 72, and that the upper face of retainer ring 56 is dished-out in the center thereof, leaving a gap between the lower end of cylinder 72 and the central bore 66 of retainer ring 56; this gap avoids any interference with fluid flow between cylinder 72 and access pipe 30.

As indicated above, annular wall 110 opens onto upper wall 42 of valve assembly 36 to provide a second port of the valve. This second port defines a predetermined cross-sectional area for fluid flow. One of the objects of the present invention is to avoid restrictions in the fluid flow path as fluid passes through the valve. To avoid the development of significant back pressures, or pressure drops, the sum of the cross sectional areas of the four openings (112, 114, 116) extending from the open end of the cylinder to the outer walls of the cylinder approximates the cross-sectional area of the second port of valve assembly 36.

It will be recalled that one of the objects of the present invention was to maintain the sealing surfaces of the valve away from the flow path to prevent such sealing surfaces from being abraded by the chemical slurry. As shown best in FIG. 8B, during flow conditions, the enlarged annular wall portion 80 of piston 70 slides below openings 112 and 116, and is covered by inner wall 88 of cylinder 72. Therefore, during flow conditions, sealing surface 80 of piston 70 is entirely out of the flow path.

Thus far, only the first valve assembly 36 has been described. It will be recalled that valve assembly 36 is inserted into access neck 26 of tote 20 by the chemical supplier. However, it will also be recalled that a user must be able to quickly connect, or quickly disconnect, valve assembly 36 from supply lines 29, 31, and 33, without contaminating either the tote 20 or the supply lines 29, 31, and 33. For such purpose, a second valve assembly 118 is provided, along with connectors for selectively coupling or uncoupling first valve assembly 36 with second valve assembly 118.

Valve assembly 118 is highly similar to valve assembly 36, except that valve assembly 118 is upside down by comparison with valve assembly 36. Like valve assembly 36, valve assembly 118 provides three valves constructed using the same retainer rings, cylinders, pistons, and compression springs already described above. For example, valve assembly 118 includes three passageways (or valve chambers) 120, 122 and 124, and three associated retainer rings 126, 128, and 130, respectively. Each such valve chamber houses a cylinder 132, a compression spring 134, and a piston 136 having the same characteristics as those already described above.

Figure 7:
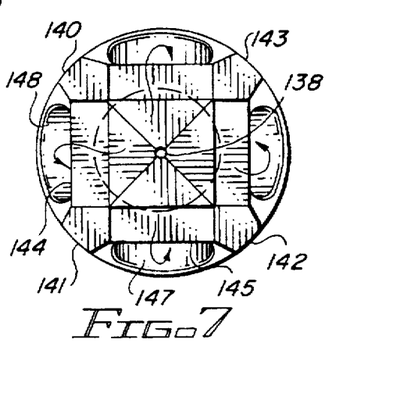
FIG. 7 is a top down view of the valve body shown in FIG. 6.

FIG. 6 is an enlarged view of cylinder 132 highlighting vent hole 138, support ribs 140, 141, 142, and 143, planar outer walls 144 and 145, enlarged annular wall 146, and fluid openings 147 and 148. FIG. 7 is an end view of cylinder 132 shown in FIG. 6 and illustrating how fluid passes around the closed end of cylinder 72, along the outer planar walls 144 and 145 thereof, and through fluid openings 144 and 145 thereof for passage outwardly through the open end of cylinder 132. Once again, the structure of cylinder 132 is identical to the structure of cylinder 72 described in conjunction with first valve assembly 36.

Within FIG. 5, the ends of three pistons 136, 150 and 152 can be seen protruding downwardly from their associated ports. When properly assembled, the ends of pistons 136, 150 and 152 align with and engage the ends of pistons 77, 79, and 70, respectively (see FIG. 4B) whereby each of such pistons are displaced against the biasing force of their associated compressions springs to retract such pistons, and to open all six of the described valves. As indicated in FIG. 5, the underside of second valve assembly 118 includes three O-rings 154, 155, and 156 surrounding each of the three ports through which pistons 136, 150 and 152 extend. When valve assembly 118 is tightened against valve assembly 36, as indicated within FIGS. 3 and 8B, O-rings 154, 155, and 156 serve to seal together the mating ports of the two valve assemblies. The manner by which it is ensured that such ports are aligned with one another during such tightening process will now be described below.

As shown in FIGS. 3, 4B, and 5, a first collar 158 has internal threads 160 formed upon the lower half of its interior matching the threads applied to access neck 26 of tote 20. The lower external portion of collar 158 is ribbed to allow a user to maintain a firm grip thereon. The upper half of collar 158 is of reduced diameter, and includes external threads 162 formed thereon. The interior of the upper half of collar 158 is smooth cylindrical.

As shown in FIG. 4B, an alignment ring 164 is also provided. The outer surface of alignment ring 164 is smooth, cylindrical, and of a diameter commensurate with the internal diameter of the upper half of collar 158. The interior of alignment ring 164 has keying ribs 166, 168, and 170 formed thereon. Keying ribs 166, 168 and 170 are adapted to engage key holes 172, 174, and 176, respectively, formed upon the upper wall 42 of first valve assembly 36. Mating key channels, including key channel 178, are formed in the external walls of second valve assembly 118 for engaging keying ribs 166, 168 and 170. Thus, alignment ring 164 ensures that the first valve assembly 36 and second valve assembly 118 are properly aligned with respect to each other.

A second collar 180 (see FIG. 4A) is also provided to complete the quick connect/disconnect assembly. Collar 180 is ribbed on its outer periphery to allow a user to firmly grasp the same. The interior of collar 180 includes threads 182 which match threads 162 applied to the external portion of the upper half of the first collar 158. The upper end of collar 180 has an aperture formed therein of a diameter equal to the diameter of the upper portion of second valve assembly 118.

In use, when connecting the second valve assembly 118 to the first valve assembly 36, first collar 158 is threaded partially over access neck 26 of the tote. Locking ring 164 is then inserted into the upper half of collar 158 and rotated until keying ribs 166–170 are aligned with, and seated in, key holes 172–176. Upper valve assembly 118 is then lowered into alignment ring 164, being careful to align the keying channels thereof with the keying ribs 166–170. Second collar 180 is then lowered over second valve assembly 118. First collar 158 and second collar 180 are then tightened, causing the valves within first valve assembly 36 and second valve assembly 118 to open simultaneously, and sealing the respective valve ports to each other.

When the supply lines are to be disconnected from tote 20, the process is reversed. As the first and second collars 158 and 180 are unthreaded, the opposing pistons stop engaging each other, and the biasing springs close all of the valves simultaneously.

Those skilled in the art will now appreciate that a quick disconnect system has been described which may be used to quickly and conveniently connect a fluid reservoir with a chemical supply line, while automatically sealing both the fluid reservoir and the chemical supply line upon disconnection. Due to the unique structure of the valves, the quick disconnect system will have a relatively long life even when used to circulate abrasive chemical slurries, particularly because the surface used to shut off fluid flow is removed from the flow path during full-flow operation. Moreover, because the biasing springs incorporated in such valves are not within the flow path, the likelihood of the introduction of metal contaminants within the fluid flow path is greatly reduced. In addition, because the described shutoff valves provide a large flow path when the valves are open, the disclosed quick connect system permits free, unrestricted fluid flow of chemical slurries without creating excessive pressure drops through the shutoff valves. Finally, the described system can be manufactured relatively easily and inexpensively.

While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

I claim:

1. A valve comprising in combination:

a. a piston having a longitudinal axis extending between first and second ends thereof, said piston having an enlarged annular side wall portion spaced apart from the first end of said piston, the enlarged annular side wall having a predetermined diameter and being cylindrical in shape, said piston including a neck portion extending generally between the first end of said piston and the enlarged annular side wall portion thereof, the lateral dimensions of the neck portion being lesser than said predetermined diameter;

b. a cylinder having inner and outer walls, the inner wall of said cylinder being annular and forming an internal bore extending from a first open end of said cylinder to a second opposing end, the inner wall of said cylinder including a portion having a substantially constant internal diameter, the substantially constant internal diameter of said substantially constant internal diameter portion closely proximate to said predetermined diameter of the enlarged annular side wall portion of said piston for receiving said piston and allowing said piston to slide within the internal bore of said cylinder, said cylinder including at least one fluid passageway extending between the inner and outer walls thereof generally proximate the first open end of said cylinder and spaced apart from the second end of said cylinder, the at least one fluid passageway extending generally annularly relative to the inner wall of said cylinder and extending through said substantially constant internal diameter portion of the inner wall of said cylinder;

c. a valve body having a central chamber for containing said cylinder and said piston, said valve body forming a seal with said cylinder at a point disposed between the at least one fluid passageway of said cylinder and the first open end of said cylinder, said valve body having a first port communicating with the outer wall of said cylinder and with the at least one fluid passageway that extends through the outer wall of said cylinder for conveying fluid between the first port of said valve body and the at least fluid passageway that extends through the outer wall of said cylinder, said valve body including a second port communicating with the open end of said cylinder and the first end of said piston for conveying fluid between the second port of said valve body and the open end of said cylinder; and d. biasing means engaged with said piston for biasing said piston away from the second end of said cylinder and toward the first open end of said cylinder, and for causing the enlarged annular side wall portion of said piston to slide across and seal the at least one generally annular opening that extends through the substantially constant internal diameter portion of the internal wall of said cylinder, said biasing means yielding to the application of a force upon the first end of said piston toward the second end of said cylinder for allowing said piston to slide within said cylinder toward the second end thereof, for displacing the enlarged annular side wall portion of said piston away from the at least one generally annular opening that extends through the internal wall of said cylinder, and to thereby allow fluid to flow freely through the at least one generally annular opening between the first and second ports of said valve body.

2. The valve recited by claim 1 wherein the at least one fluid passageway extending between the inner and outer walls of said cylinder is generally directed toward the open end of said cylinder.

3. The valve recited by claim 1 wherein the neck portion of said piston extending generally from the first end of said piston toward the enlarged annular side wall portion thereof, the diameter of the tapered neck portion being smallest at the first end of said piston and increasing in diameter as the tapered neck portion extends toward the enlarged annular side wall portion.

4. The valve recited by claim 1 wherein the second end of said cylinder is closed.

5. The valve recited by claim 4 wherein said biasing means is contained within said cylinder.

6. The valve recited by claim 4 wherein the second closed end of said cylinder has a vent hole formed therethrough for allowing any fluid disposed between said piston and the second closed end of said cylinder to escape when a force is applied to the first end of said piston toward the second end of said cylinder, and to allow fluid to enter between said piston and the second closed end of said cylinder when said force is removed.

7. The valve recited by claim 1 wherein said cylinder includes a plurality of fluid passageways each extending between the inner and outer walls thereof generally proximate the first open end of said cylinder and spaced apart from the second end of said cylinder, each of the plurality of fluid passageways extending generally annularly relative to the inner wall of said cylinder, and each of the plurality of fluid passageways being selectively sealed or opened by the enlarged annular side wall portion of said piston as said piston slides within said cylinder.

8. The valve recited by claim 7 wherein the second port of said valve body that communicates with the open end of said cylinder has a predetermined cross-sectional area for fluid flow, and wherein each of the plurality of fluid passageways that extend through said cylinder has a cross-sectional area for fluid flow, and wherein the sum of the cross-sectional areas of the plurality of fluid passageways approximates the predetermined cross-sectional area for fluid flow of the second port of said valve body.

9. The valve recited by claim 1 wherein said biasing means is a metal spring.

10. The valve recited by claim 9 wherein a fluid flow path of said valve is defined by said piston, by the at least one fluid passageway through said cylinder, and by the first and second ports of said valve body, and wherein said metal spring is disposed between said piston and the second end of said cylinder outside the fluid flow path of said valve.

11. The valve recited by claim 1 wherein the first end of said piston extends through the first port of said valve body when said biasing means biases said piston away from the second end of said cylinder.

12. A quick-disconnect system for allowing a fluid supply line to be quickly connected to or disconnected from a reservoir of fluid without contaminating either the fluid reservoir or the fluid supply line, said quick-disconnect system comprising:

a. a fluid reservoir for containing a supply of fluid and including a first valve, said first valve including:

i. a first piston having a longitudinal axis extending between first and second ends thereof, said first piston having an enlarged annular side wall portion spaced apart from the first end of said first piston, the enlarged annular side wall having a predetermined diameter and being cylindrical in shape, said first piston including a neck portion extending generally between the first end of said first piston and the enlarged annular side wall portion thereof, the lateral dimensions of the neck portion being lesser than said predetermined diameter;

ii. a first cylinder having inner and outer walls, the inner wall of said first cylinder being annular and forming an internal bore extending from a first open end of said first cylinder to a second opposing end, the inner wall of said first cylinder including a portion having a substantially constant internal diameter, the substantially constant internal diameter of said substantially constant internal diameter portion being closely proximate to said predetermined diameter of the enlarged annular side wall portion of said first piston for receiving said first piston and allowing said first piston to slide within the internal bore of said first cylinder, said first cylinder including at least one fluid passageway extending between the inner and outer walls thereof generally proximate the first open end of said first cylinder and spaced apart from the second end of said first cylinder, the at least one fluid passageway extending generally annularly relative to the inner wall of said first cylinder and extending through said substantially constant internal diameter portion of the inner wall of said first cylinder, iii. a first valve body having a central chamber for containing said first cylinder and said first piston, said first valve body being sealed with said first cylinder at a point disposed between the at least one fluid passageway of said first cylinder and the first open end of said first cylinder, said first valve body having a first port communicating with the supply of fluid contained by said fluid reservoir, said first port also communicating with the outer wall of said first cylinder and with the at least one fluid passageway that extends through the outer wall of said first cylinder for conveying fluid between the first port of said first valve body and the at least one fluid passageway that extends through the outer wall of said first cylinder, said first valve body including a second port communicating with the open end of said first cylinder and the first end of said first piston for conveying fluid between the second port of said first valve body and the open end of said first cylinder, the first end of said first piston extending through the second port of said first valve body; and iv. first biasing means engaged with said first piston for biasing said first piston away from the second end of said cylinder and toward the first open end of said first cylinder, and for causing the enlarged annular side wall portion of said first piston to slide across and seal the at least one generally annular opening that extends through the substantially constant internal diameter portion of the internal wall of said first cylinder, said first biasing means yielding to the application of a force upon the first end of said first piston toward the second end of said first cylinder for allowing said first piston to slide within said first cylinder toward the second end thereof, for displacing the enlarged annular side wall portion of said first piston away from the at least one generally annular opening that extends through the internal wall of said first cylinder, and to thereby allow fluid to flow freely through the at least one generally annular opening between the first and second ports of said first valve body;

b. a fluid supply line for conveying fluid to or from a point of use, said fluid supply line including a second valve, said second valve including:

i. a second piston having a longitudinal axis extending between first and second ends thereof, said second piston having an enlarged annular side wall portion spaced apart from the first end of said second piston, the enlarged annular side wall having a predetermined diameter and being cylindrical in shape, said second piston including a neck portion extending generally between the first end of said second piston and the enlarged annular side wall portion thereof, the lateral dimensions of the neck portion being lesser than said predetermined diameter;

ii. a second cylinder having inner and outer walls, the inner wall of said second cylinder being annular and forming an internal bore extending from a first open end of said second cylinder to a second opposing end, the inner wall of said second cylinder including a portion having a substantially constant internal diameter, the substantially constant internal diameter of said substantially constant internal diameter portion being closely proximate to said predetermined diameter of the enlarged annular side wall portion of said second piston for receiving said second piston and allowing said second piston to slide within the internal bore of said second cylinder, said second cylinder including at least one fluid passageway extending between the inner and outer walls thereof generally proximate the first open end of said second cylinder and spaced apart from the second end of said second cylinder, the at least one fluid passageway extending generally annularly relative to the inner wall of said second cylinder and extending through said substantially constant internal diameter portion of the inner wall of said second cylinder;

iii. a second valve body having a central chamber for containing said second cylinder and said second piston, said second valve body forming a seal with said second cylinder at a point disposed between the at least one fluid passageway of said second cylinder and the first open end of said second cylinder, said second valve body having a first port communicating with fluid conveyed by said fluid supply line and communicating with the outer wall of said second cylinder and with the at least one fluid passageway that extends through the outer wall of said second cylinder for conveying fluid between the first port of said second valve body and the at least one fluid passageway that extends through the outer wall of said second cylinder, said second valve body including a second port communicating with the open end of said second cylinder and the first end of said second piston for conveying fluid between the second port of said second valve body and the open end of said second cylinder, the first end of said second piston extending through the second port of said second valve body; and iv. second biasing means engaged with said second piston for biasing said second piston away from the second end of said cylinder and toward the first open end of said second cylinder, and for causing the enlarged annular side wall portion of said second piston to slide across and seal the at least one generally annular opening that extends through the substantially constant internal diameter portion of the internal wall of said second cylinder, said second biasing means yielding to the application of a force upon the first end of said second piston toward the second end of said second cylinder for allowing said second piston to slide within said second cylinder toward the second end thereof, for displacing the enlarged annular side wall portion of said second piston away from the at least one generally annular opening that extends through the internal wall of said second cylinder, and to thereby allow fluid to flow freely through the at least one generally annular opening between the first and second ports of said second valve body; and c. fastening means for selectively fastening together the second port of said first valve body with the second port of the second valve body and for causing the first end of said first piston to contact and push against the first end of said second piston, whereby the mutual forces of the first and second pistons pushing against each other simultaneously overcomes the first and second biasing means for allowing fluid to flow freely between the first port of said first valve body and the first port of said second valve body, and hence between said fluid reservoir and said fluid supply line.

13. The quick-disconnect system recited by claim 12 wherein:
   a. the at least one fluid passageway extending between the inner and outer walls of said first cylinder is generally directed toward the open end of said first cylinder; and
   b. the at least one fluid passageway extending between the inner and outer walls of said second cylinder is generally directed toward the open end of said second cylinder.

14. The quick-disconnect system recited by claim 12 wherein:
   a. the neck portion of said first piston extends generally from the first end of said first piston toward the enlarged annular side wall portion thereof, the diameter of the tapered neck portion being smallest at the first end of said first piston and increasing in diameter as the tapered neck portion extends toward the enlarged annular side wall portion of said first piston; and
   b. the neck portion of said second piston extends generally from the first end of said second piston toward the enlarged annular side wall portion thereof, the diameter of the tapered neck portion being smallest at the first end of said second piston and increasing in diameter as the tapered neck portion extends toward the enlarged annular side wall portion of said second piston.

15. The quick-disconnect system recited by claim 12 wherein:
   a. the second end of said first cylinder is closed; and
   b. the second end of said second cylinder is closed.

16. The quick-disconnect system recited by claim 15 wherein:
   a. said first biasing means is contained within said first cylinder; and
   b. said second biasing means is contained within said second cylinder.

17. The quick-disconnect system recited by claim 15 wherein:
   a. the second closed end of said first cylinder has a vent hole formed therethrough for allowing any fluid disposed between said first piston and the second closed end of said first cylinder to escape when said first and second valves are connected, and to allow fluid to enter between said first piston and the second closed end of said first cylinder when said first and second valves are disconnected; and
   b. the second closed end of said second cylinder has a vent hole formed therethrough for allowing any fluid disposed between said second piston and the second closed end of said second cylinder to escape when said first and second valves are connected, and to allow fluid to enter between said second piston and the second closed end of said second cylinder when said first and second valves are disconnected.

18. The quick-disconnect system recited by claim 12 wherein:
   a. said first cylinder includes a plurality of fluid passageways each extending between the inner and outer walls thereof generally proximate the first open end of said first cylinder and spaced apart from the second end of said first cylinder, each of the plurality of fluid passageways extending generally annularly relative to the inner wall of said first cylinder, and each of the plurality of fluid passageways being selectively sealed or opened by the enlarged annular side wall portion of said first piston as said first piston slides within said first cylinder; and
   b. said second cylinder includes a plurality of fluid passageways each extending between the inner and outer walls thereof generally proximate the first open end of said second cylinder and spaced apart from the second end of said second cylinder, each of the plurality of fluid passageways extending generally annularly relative to the inner wall of said second cylinder, and each of the plurality of fluid passageways being selectively sealed or opened by the enlarged annular side wall portion of said second piston as said second piston slides within said second cylinder.

19. The quick-disconnect system recited by claim 7 wherein:
   a. the second port of said first valve body has a predetermined cross-sectional area for fluid flow, and wherein each of the plurality of fluid passageways that extend through said first cylinder has a cross-sectional area for fluid flow, and wherein the sum of the cross-sectional areas of the plurality of fluid passageways extending through said first cylinder approximates the predetermined cross-sectional area for fluid flow of the second port of said first valve body; and
   b. the second port of said second valve body has a predetermined cross-sectional area for fluid flow, and wherein each of the plurality of fluid passageways that extend through said second cylinder has a cross-sectional area for fluid flow, and wherein the sum of the cross-sectional areas of the plurality of fluid passageways extending through said second cylinder approximates the predetermined cross-sectional area for fluid flow of the second port of said second valve body.

20. The quick-disconnect system recited by claim 12 wherein said first biasing means and said second biasing means are each a metal spring.

21. The quick-disconnect system recited by claim 20 wherein:
   a. a fluid flow path of said first valve is defined by said first piston, by the at least one fluid passageway through said first cylinder, and by the first and second ports of said first valve body, and wherein the metal spring forming said first biasing means is disposed between said first piston and the second end of said first cylinder outside the fluid flow path of said first valve; and
   b. a fluid flow path of said second valve is defined by said second piston, by the at least one fluid passageway through said second cylinder, and by the first and second ports of said second valve body, and wherein the metal spring forming said second biasing means is disposed between said second piston and the second end of said second cylinder outside the fluid flow path of said second valve.

\* \* \* \* \*